(12) United States Patent
Truitt et al.

(10) Patent No.: US 12,420,345 B2
(45) Date of Patent: Sep. 23, 2025

(54) BLADE CLAMP FOR RECIPROCATING SAW

(71) Applicant: TECHTRONIC CORDLESS GP, Anderson, SC (US)

(72) Inventors: Benson E. Truitt, Greenville, SC (US); Seth Austin Hartley, Greenville, SC (US)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 17/677,781

(22) Filed: Feb. 22, 2022

(65) Prior Publication Data
US 2023/0264276 A1 Aug. 24, 2023

(51) Int. Cl.
*B23D 49/16* (2006.01)
*B23D 51/02* (2006.01)
*B23D 51/10* (2006.01)
*B23D 51/16* (2006.01)
*F16H 57/031* (2012.01)

(52) U.S. Cl.
CPC .......... *B23D 49/162* (2013.01); *B23D 51/02* (2013.01); *B23D 51/10* (2013.01); *B23D 51/16* (2013.01); *F16H 57/031* (2013.01)

(58) Field of Classification Search
CPC ...... B23D 49/162; B23D 51/02; B23D 51/10; B23D 51/16; F16H 57/031
See application file for complete search history.

(56) References Cited

U.S. PATENT DOCUMENTS 3,802,079 A * 4/1974 Ketchpel, Jr. .......... B23D 51/16
30/376
5,697,279 A * 12/1997 Schnizler ............... B23D 51/10
83/698.31
(Continued)

FOREIGN PATENT DOCUMENTS

CN 206356659 U 7/2017
CN 109332810 A 2/2019
(Continued)

OTHER PUBLICATIONS

Pearson, Education, Inc., "Chapter 11 Rotational Dynamics and Static Equilibrium," 2010, available on Dec. 12, 2024 at: http://nsmn1.uh.edu/hpeng5/Peng11_LectureOutline.pdf (Year: 2010).*
(Continued)

*Primary Examiner* — Jonathan G Riley
(74) *Attorney, Agent, or Firm* — Michael Best & Friedrich LLP

(57) ABSTRACT

A reciprocating tool includes a housing, a spindle having an end configured to receive a saw blade, and a blade clamp mechanism supported on the spindle and configured to attach the saw blade to the spindle. The blade clamp mechanism includes a locking member movable relative to the spindle between a locked position and an unlocked position. The blade clamp mechanism also includes an actuating member that is rotatable relative to the spindle between an engaged position and a released position. The actuating member defines a gripping surface with ridges and includes a first tab and a second tab, each of the first tab and the second tab protruding radially from the outer gripping surface.

14 Claims, 10 Drawing Sheets

(56) References Cited

U.S. PATENT DOCUMENTS

| | | | |
|---|---|---|---|
| 5,722,309 A | 3/1998 | Seyerle | |
| 6,178,646 B1 | 1/2001 | Schnell et al. | |
| 6,209,208 B1* | 4/2001 | Marinkovich | B23D 51/10 271/81 |
| 6,230,411 B1 | 5/2001 | Wall et al. | |
| 6,233,833 B1 | 5/2001 | Grant et al. | |
| 6,308,425 B1 | 10/2001 | Schumann | |
| 6,357,124 B1 | 3/2002 | Wall et al. | |
| 6,612,039 B2 | 9/2003 | Kakiuchi et al. | |
| 6,725,548 B1* | 4/2004 | Kramer | B23D 51/10 30/392 |
| 6,735,876 B2 | 5/2004 | Hirabayashi | |
| 7,040,023 B2 | 5/2006 | Nemazi et al. | |
| 7,251,897 B2 | 8/2007 | Shuhua | |
| 7,871,080 B2 | 1/2011 | Marini et al. | |
| 8,024,865 B2 | 9/2011 | Kaiser et al. | |
| 8,082,671 B2 | 12/2011 | Saegesser | |
| 8,272,135 B2 | 9/2012 | Zhou | |
| 8,393,625 B2 | 3/2013 | Marini et al. | |
| 8,555,516 B2 | 10/2013 | Da Graca | |
| 8,641,049 B2 | 2/2014 | Marini et al. | |
| 8,826,549 B2 | 9/2014 | Da Graca | |
| 9,038,278 B2 | 5/2015 | Kani et al. | |
| 9,186,735 B2 | 11/2015 | Da Graca | |
| 9,205,502 B2 | 12/2015 | Sugino | |
| 10,661,364 B2 | 5/2020 | Laett | |
| 2004/0035010 A1 | 2/2004 | Kakiuchi et al. | |
| 2009/0223071 A1* | 9/2009 | Alberti | B23D 49/162 30/392 |
| 2009/0277022 A1* | 11/2009 | Limberg | B23D 51/10 279/81 |
| 2011/0010951 A1* | 1/2011 | Harrison | B23D 51/02 30/376 |
| 2012/0241654 A1* | 9/2012 | Clifford | F16K 31/60 74/553 |
| 2019/0381586 A1* | 12/2019 | Cholst | B23D 51/10 |
| 2020/0391311 A1 | 12/2020 | Kuehne et al. | |
| 2021/0046562 A1* | 2/2021 | Zhou | B23D 51/10 |

FOREIGN PATENT DOCUMENTS

| | | | |
|---|---|---|---|
| CN | 209407569 U | 9/2019 | |
| CN | 209465767 U | 10/2019 | |
| CN | 214557891 U | 11/2021 | |
| DE | 20307473 U1 | 7/2003 | |
| GB | 2069406 A * | 8/1981 | B23D 51/10 |
| GB | 2069406 B | 8/1983 | |
| GB | 2336805 B | 9/2000 | |
| GB | 2344563 B | 12/2000 | |
| WO | 2019129488 A1 | 7/2019 | |

OTHER PUBLICATIONS

Dewalt, "Atomic 20-Volt MAX Cordless Brushless Compact Reciprocating Saw (Tool-Only)," <https://www.homedepot.com/p/DEWALT-ATOMIC-20-Volt-MAX-Cordless-Brushless-Compact-Reciprocating-Saw-Tool-Only-DCS369B/308961332> web page publicly available at least as early as Feb. 11, 2022.

* cited by examiner

BLADE CLAMP FOR RECIPROCATING SAW

FIELD OF THE DISCLOSURE

The present invention relates to reciprocating saws and more specifically to a blade clamp for replacing and securing a saw blade to a spindle of a reciprocating saw.

BACKGROUND OF THE DISCLOSURE

Reciprocating tools, such as handheld reciprocating saws, include removable blades, which permits the use of different cutting edges as may be necessary for cutting different materials and for the replacement of worn or damaged blades. Some blade mounting systems for coupling the blade to the reciprocating tool can require a separate tool, such as a wrench or a special key, to replace and secure the blade. Other reciprocating tools use blade clamps that do not require a tool. These are commonly called keyless blade clamps.

SUMMARY OF THE DISCLOSURE

The present disclosure provides, in one aspect, a reciprocating tool including a housing, a spindle mounted for reciprocating movement within the housing and having an end configured to receive a saw blade, and a blade clamp mechanism supported on the spindle and configured to attach the saw blade to the spindle. The blade clamp mechanism includes a locking member movable relative to the spindle between a locked position that locks the saw blade to the spindle and an unlocked position that releases the saw blade. The blade clamp mechanism also includes an actuating member that is supported on the end of the spindle and rotatable relative to the spindle between an engaged position corresponding to the locked position of the locking member, and a released position corresponding to the unlocked position of the locking member. The actuating member defines a gripping surface with ridges and includes a first tab and a second tab. Each of the first tab and the second tab protruding radially from the outer gripping surface.

The present disclosure provides, in another aspect, a reciprocating tool including a housing, a spindle mounted for reciprocating movement within the housing and having an end configured to receive a saw blade, and a blade clamp mechanism supported on the spindle and configured to attach the saw blade to the spindle. The blade clamp mechanism includes a locking member movable relative to the spindle between a locked position that locks the saw blade to the spindle and an unlocked position that releases the saw blade. The blade clamp mechanism also includes an actuating member supported on the end of the spindle and rotatable relative to the spindle between an engaged position, corresponding to the locked position of the locking member, and a released position, corresponding to the unlocked position of the locking member. The reciprocating tool also includes a shoe assembly coupled to the housing, the shoe assembly including a first bar and a second bar, each bar having a flat upper surface, the flat upper surfaces defining an upper shoe plane. The actuating member defines an outer gripping surface and includes a tab that protrudes radially from the outer gripping surface. When the actuating member is in the engaged position, at least a portion of the tab protrudes beyond the upper shoe plane.

Other aspects of the disclosure will become apparent by consideration of the detailed description and accompanying drawings.

Before any embodiments of the disclosure are explained in detail, it is to be understood that the disclosure is not limited in its application to the details of embodiment and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
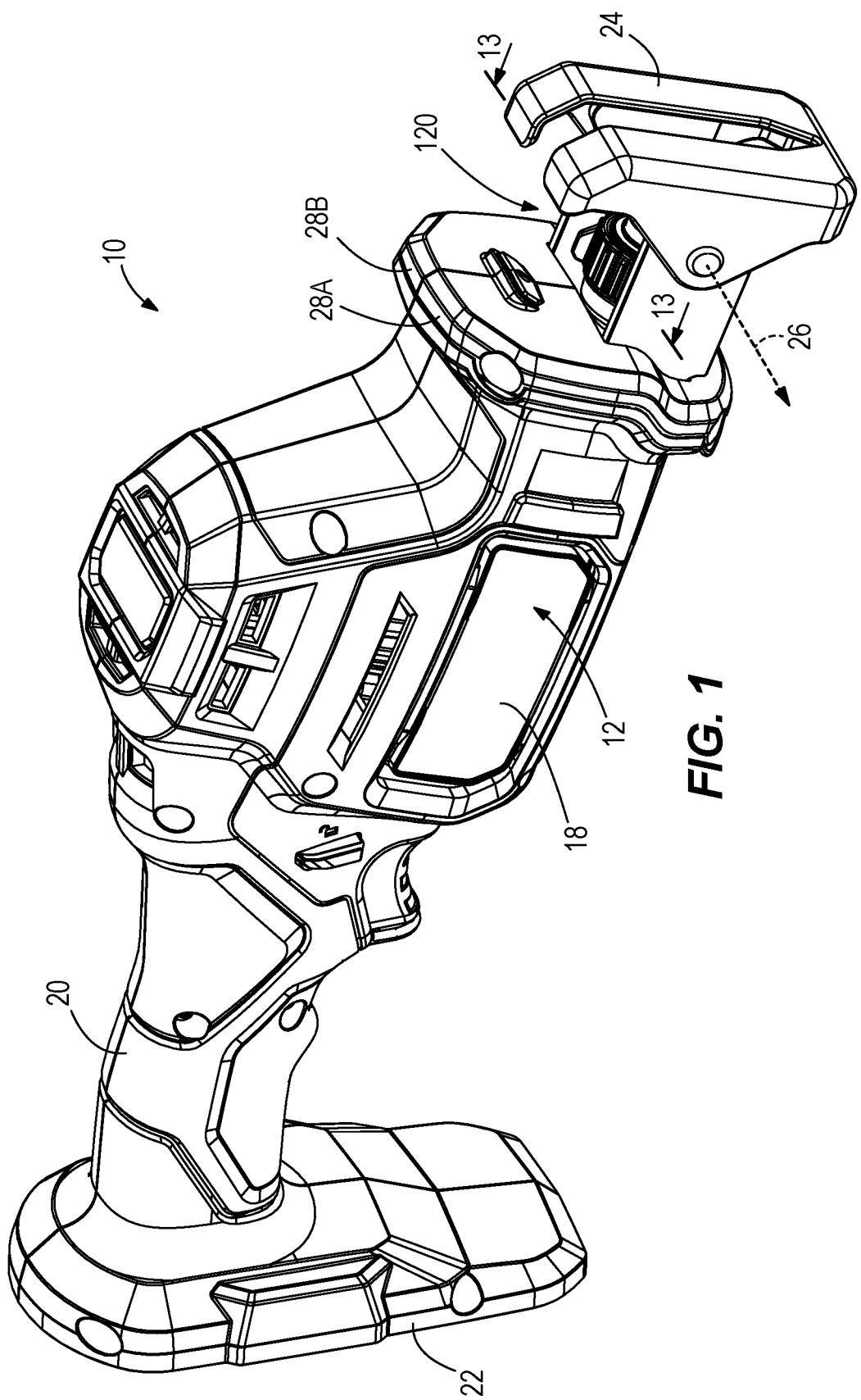
FIG. 1 is a perspective view of a reciprocating saw according to an embodiment of the disclosure.
Figure 2:
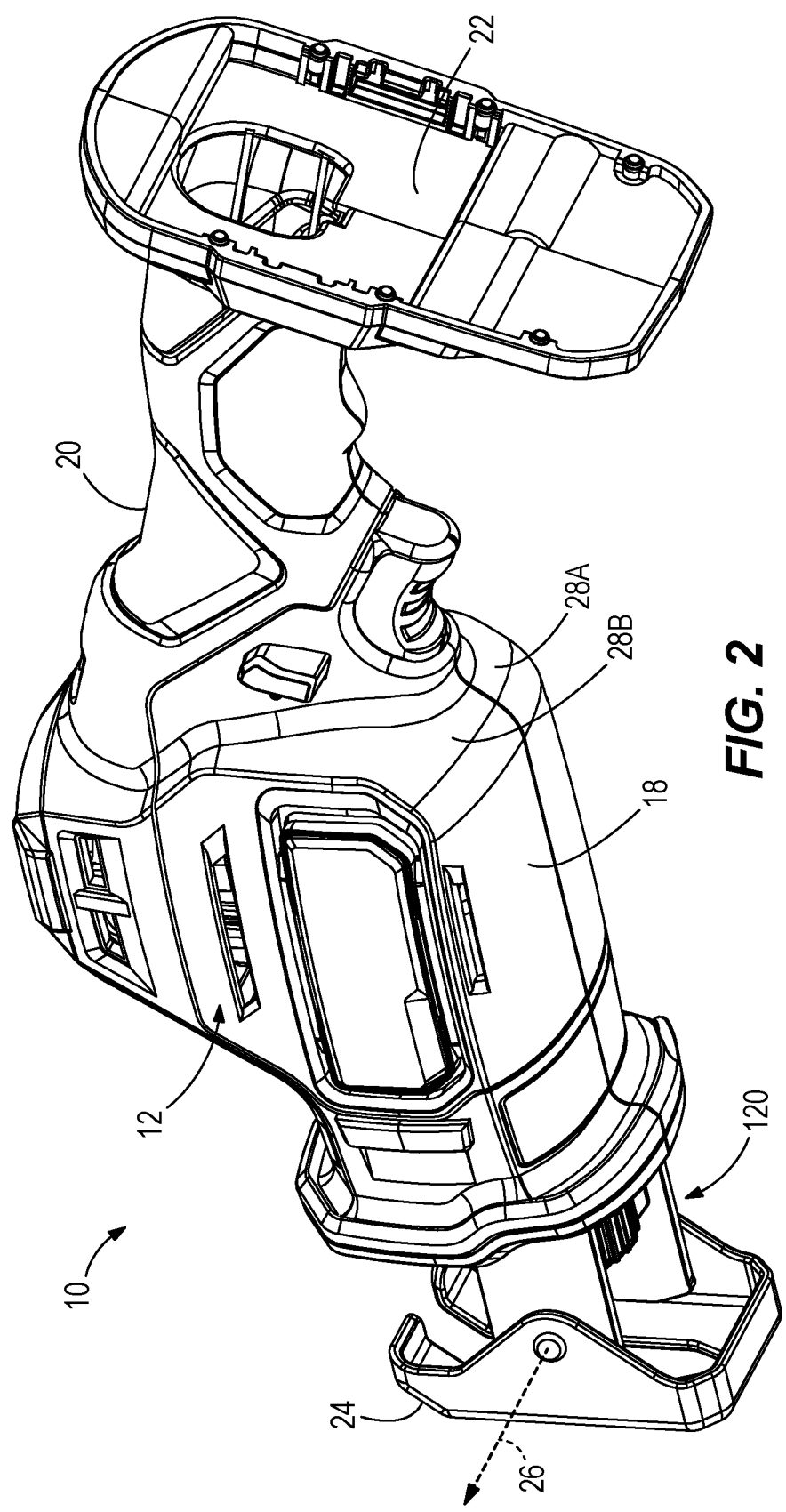
FIG. 2 is another perspective view of the reciprocating saw of FIG. 1.

FIGS. 1 and 2 illustrate a reciprocating power tool 10. In the illustrated embodiment, the power tool 10 is a reciprocating saw. In other embodiments, the power tool 10 may be another type of device that utilized a reciprocating-type drive mechanism, such as a jigsaw or sabre saw, or the like.

The illustrated reciprocating saw 10 includes a housing 12, a motor 14, and a drive mechanism 16 that is operably coupled to the motor 14 and that is positioned within the housing 12. The housing 12 includes a motor housing portion 18 that supports the motor 14, a handle portion 20, and a battery support portion 22 that selectively and removably receives a battery pack (not shown). A shoe 24 extends from and is pivotally coupled to the motor housing portion 18 of the housing 12. The shoe 24 pivots about a pivot axis 26 and facilitates aligning the reciprocating saw 10 on a work piece to be cut.

The battery support portion 22 has one or more attachment features that supports a battery pack (e.g., an 18 volt Li-ion power tool battery pack), and the battery support portion 22 electrically connects the battery pack to the motor 14. In other embodiments, the battery pack may have different voltages and/or chemistries. In still other embodiments, the reciprocating saw 10 may include a power cord such that the motor 14 is powered by an AC power source (e.g., a wall outlet, a portable generator, etc.).

Figure 3:
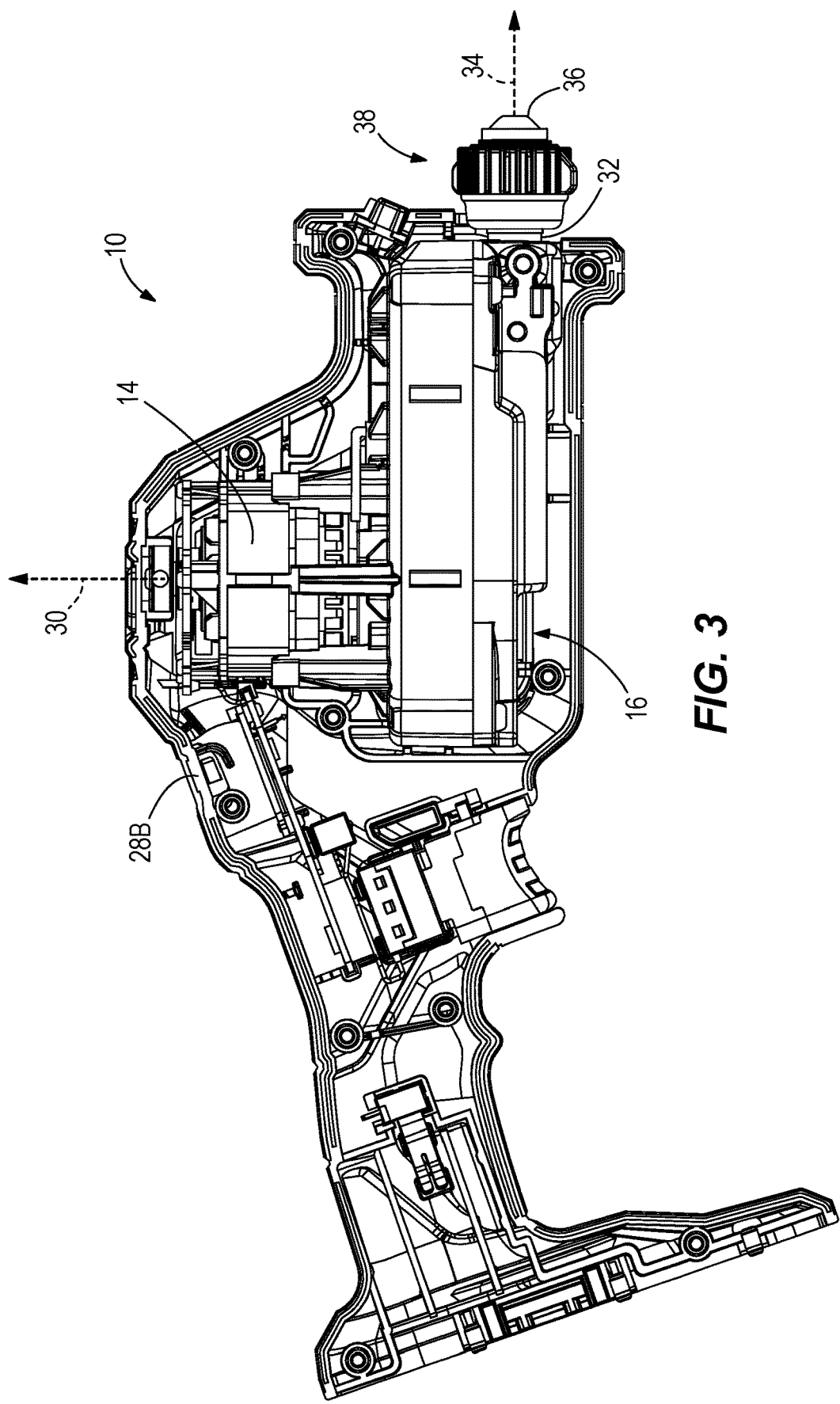
FIG. 3 is a side view of the reciprocating saw of FIG. 1 with a portion of the housing removed.

The housing 12 includes two clamshell halves 28A, 28B that are connected together along a vertical plane. FIG. 3 illustrates the reciprocating saw 10 with one of the clamshell halves 28A removed to facilitate illustration of the internal components (e.g., the motor 14, the drive mechanism 16, etc.) of the reciprocating saw 10. The motor 14 is positioned within the motor housing portion 18 and centrally defines a motor axis 30. The drive mechanism 16 is positioned within the motor housing portion 18 beneath the motor 14 and is coupled to a spindle 32. The drive mechanism 16 receives a torque from the motor 14 and drives the spindle 32 to reciprocate along a spindle axis 34. In the illustrated embodiment, the spindle axis 34 is generally perpendicular to the motor axis 30.

Figure 4A:
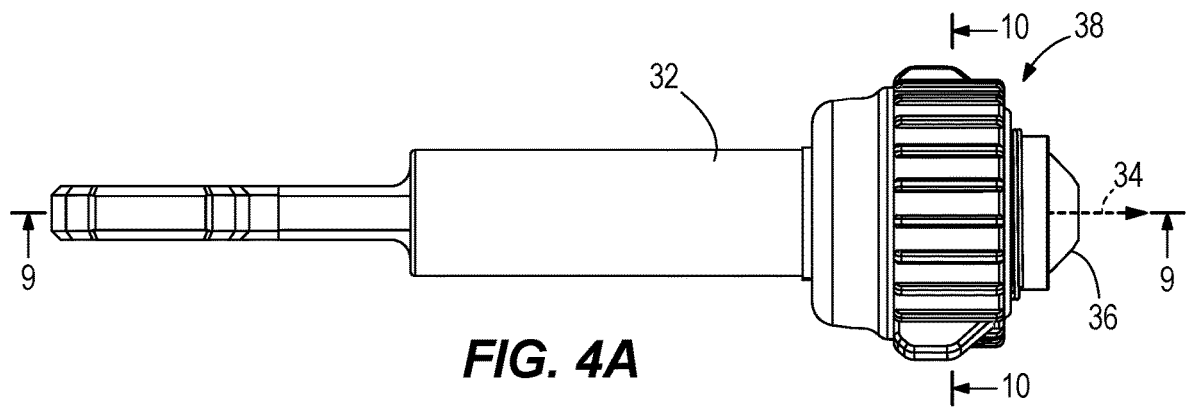
FIG. 4A is a side view of a spindle and a blade clamp mechanism of the reciprocating saw of FIG. 1.
Figure 4B:
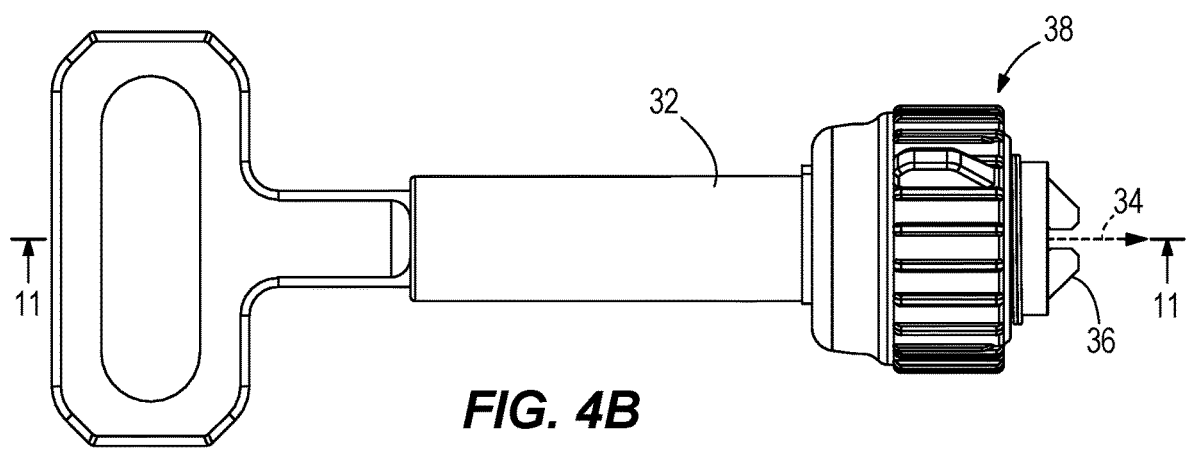
FIG. 4B is a top view of the spindle and the blade clamp mechanism of FIG. 1.
Figure 6:
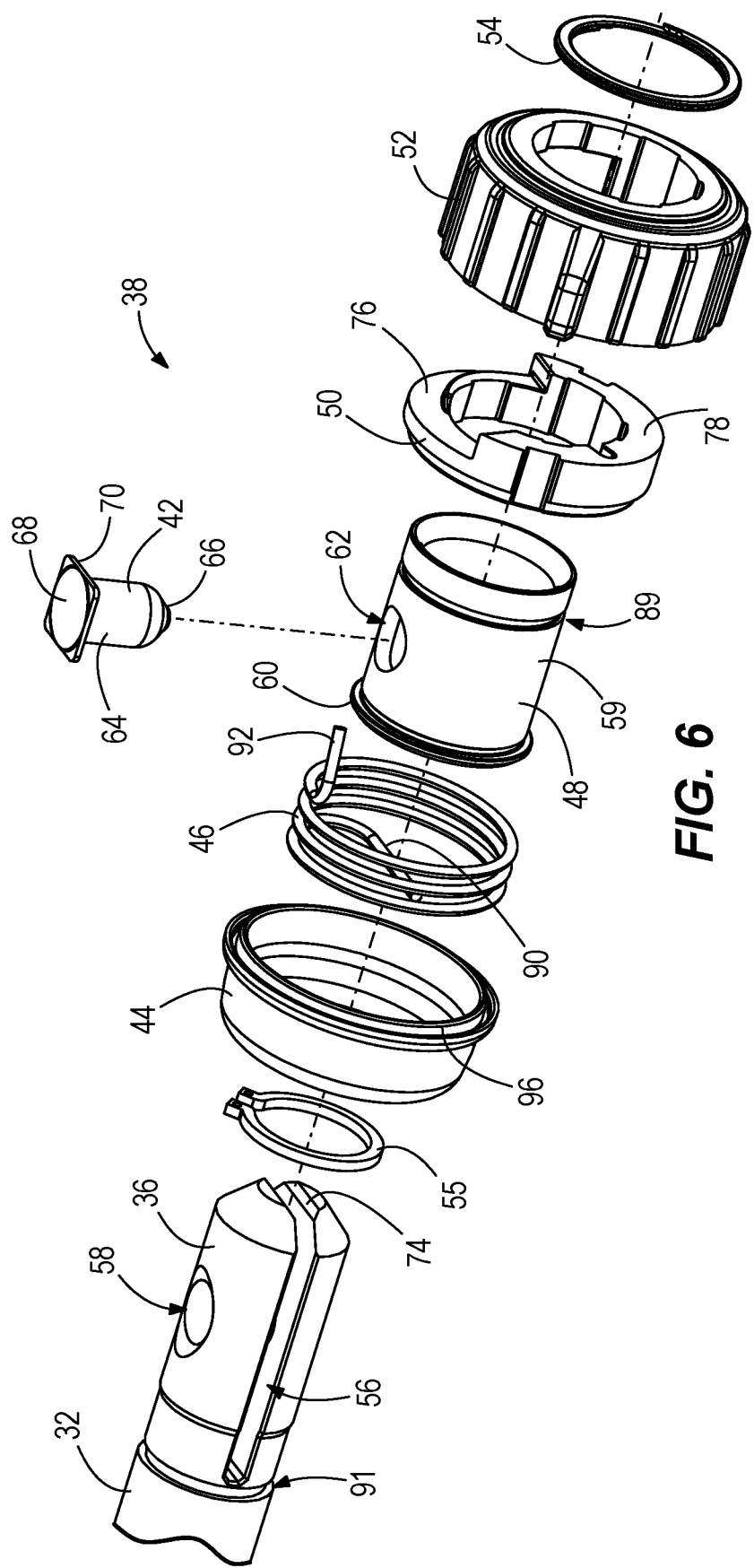
FIG. 6 is an exploded perspective view of the spindle and the blade clamp mechanism of FIGS. 4A and 4B.
Figure 9A:
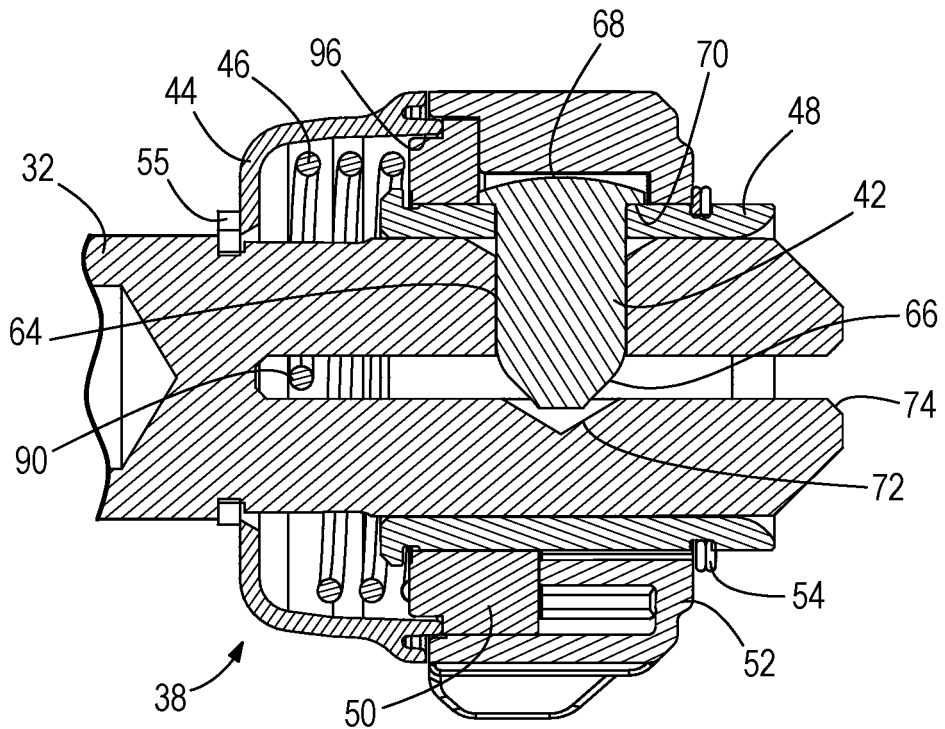
FIG. 9A is an axial section view taken along line 9-9 in FIG. 4A with the blade clamp mechanism in an engaged condition.
Figure 9B:
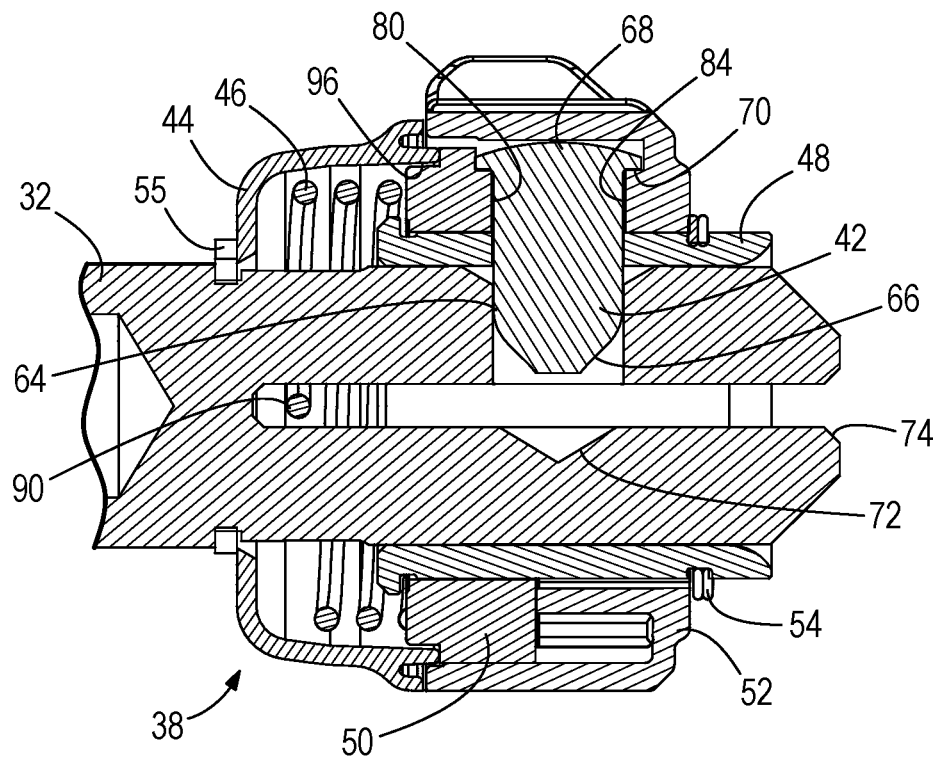
FIG. 9B is an axial section view taken along line 9-9 in FIG. 4A with the blade clamp mechanism in a released condition.
Figure 10A:
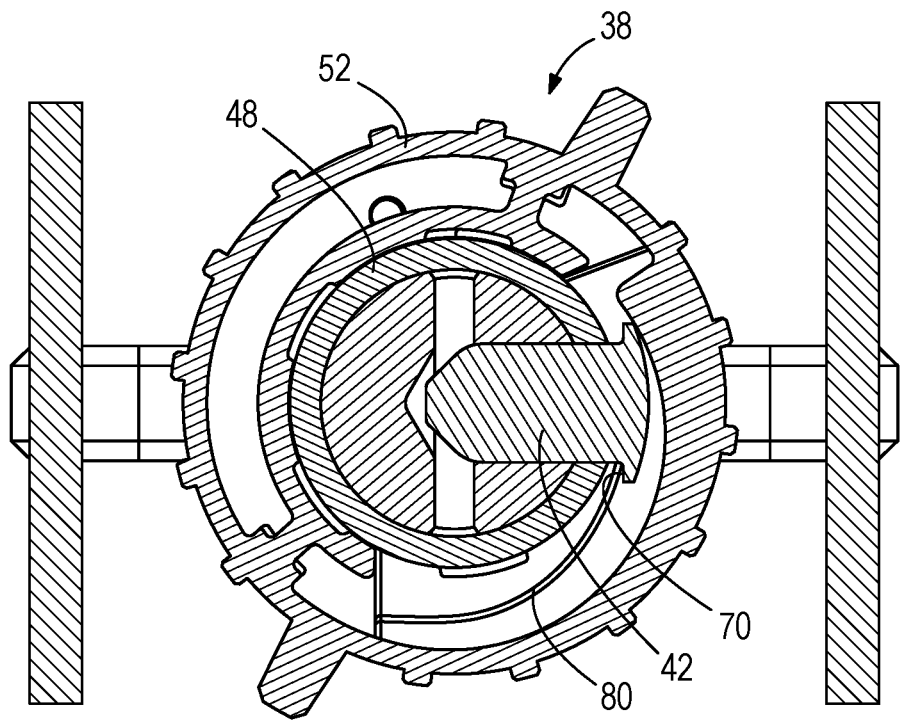
FIG. 10A is a lateral section view taken along line 10-10 in FIG. 4A with the blade clamp mechanism in an engaged condition.
Figure 10B:
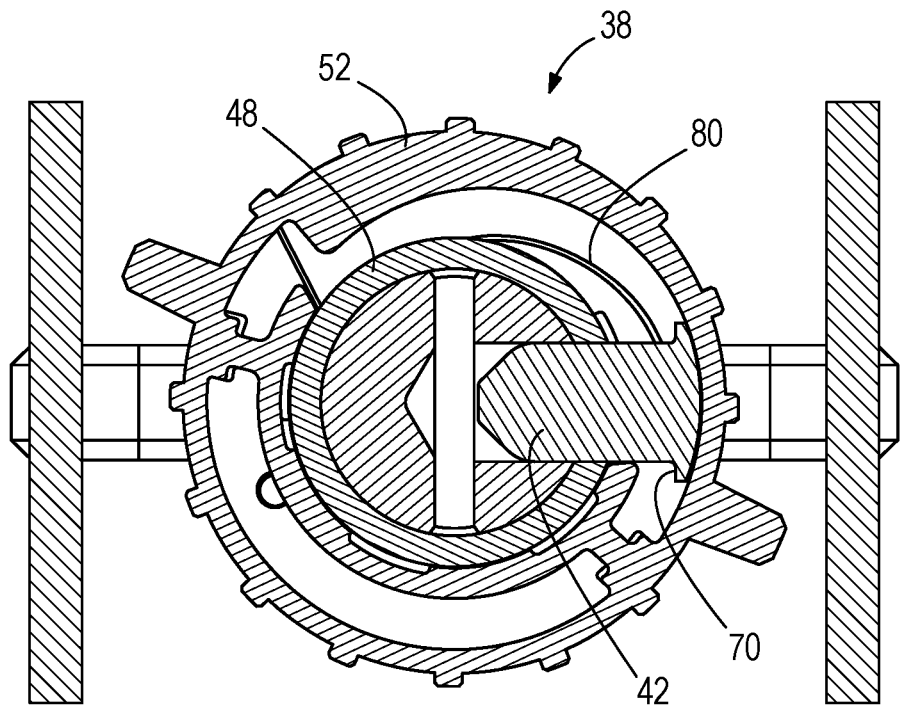
FIG. 10B is a lateral section view taken along line 10-10 in FIG. 4A with the blade clamp mechanism in a released condition.
Figure 11:
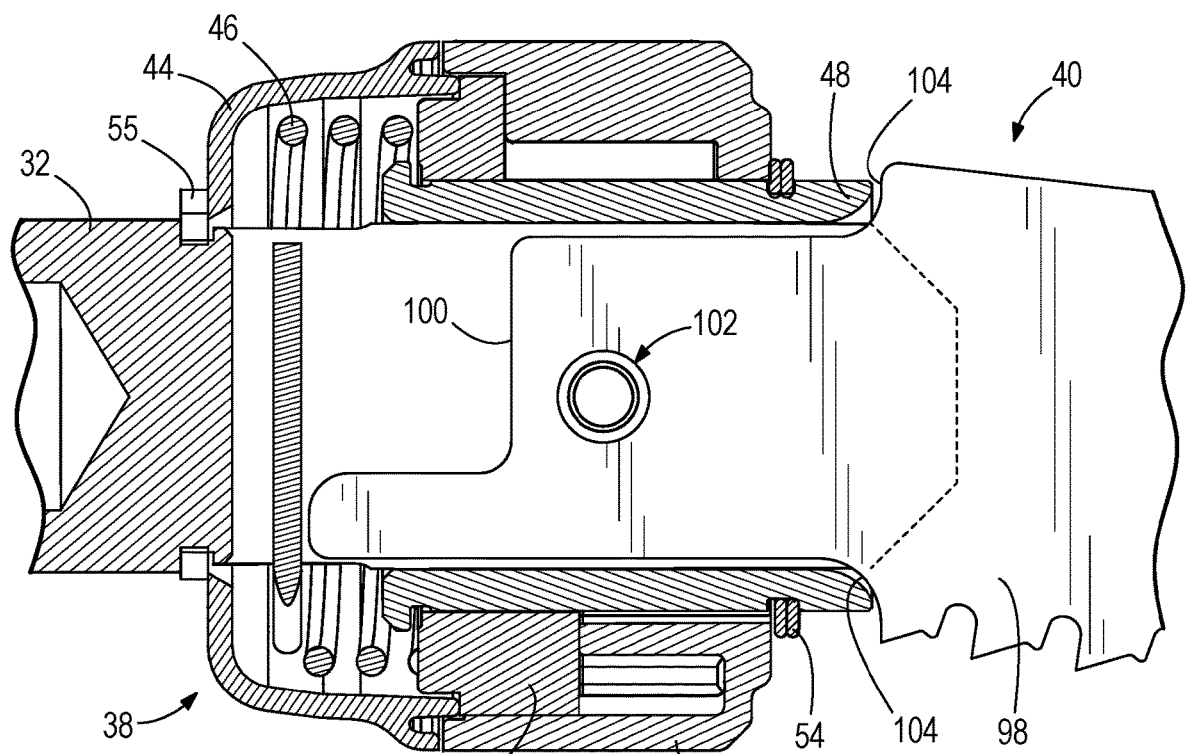
FIG. 11 is a section view taken along line 11-11 in FIG. 4B and showing the saw blade of FIG. 5 inserted in the blade clamp mechanism of FIGS. 4A and 4B.

With reference to FIGS. 4A and 4B, the spindle 32 includes a spindle tip 36 that supports a blade clamp mechanism 38 for removably and releasably coupling the saw blade 40 (or another saw blade) to the spindle 32. As shown in FIG. 6, the blade clamp mechanism 38 includes a pin 42, a spring cover 44, a spring 46, a sleeve 48, a rear cam member 50, a front cam member 52, a front retainer clip 54, and a rear retainer clip 55. The spindle tip 36 includes a slot 56 that is dimensioned to receive the saw blade 40, and a spindle orifice 58 that extends laterally from an outer surface of the spindle tip 36 to the slot 56. With reference to FIGS. 6 and 9A-9B, the sleeve 48 is positioned around the spindle tip 36 and includes a cylindrical body portion 59 and a flange 60. The inner diameter of the body portion 59 is dimensioned to receive the spindle tip 36, and the body portion 59 has a sleeve orifice 62 that is aligned with the spindle orifice 58.

The pin 42 is slidably positioned within the sleeve orifice 62 and the spindle orifice 58. Referring to FIG. 9A, the pin 42 includes a cylindrical portion 64 and a conical portion 66 with a surface angled at about 45° relative to the surface of the cylindrical portion 64. The pin 42 further includes a head portion 68 that defines a shoulder 70 to facilitate lifting the pin 42, as described below in more detail. The illustrated head portion 68 is square in cross-section (FIG. 6), although other cross-sections are possible. As shown in FIGS. 9A-10B, the spindle 32 includes a drill point 72 in the form of a recess adapted to accommodate the end of the pin 42 if the pin 42 extends through the slot 56.

As shown in FIGS. 4A-4B, and 9A-9B, the spindle tip 36 extends axially beyond the end of the sleeve 48 to provide additional support to the saw blade 40, resulting in reduced blade breakage. In addition, the spindle tip 36 includes a chamfered or radiused tip 74 (FIGS. 9A-9B). The chamfered or radiused tip 74 also reduces a risk of blade breakage.

Figure 8A:
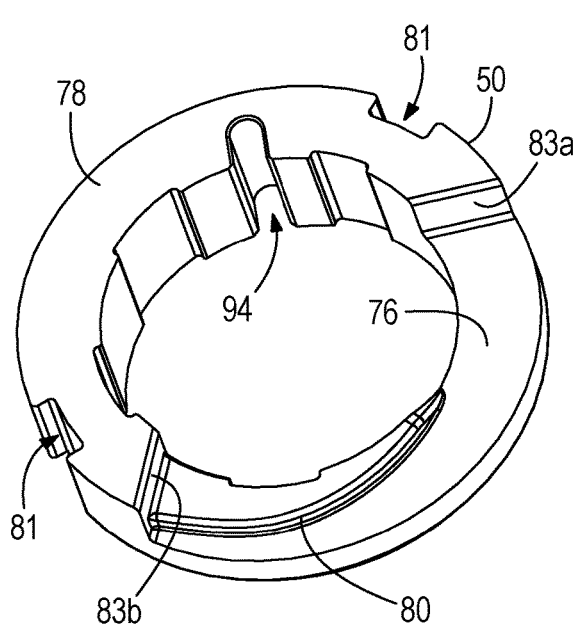
FIG. 8A is a perspective of a rear cam member of the blade clamp mechanism of FIGS. 4A and 4B.
Figure 8B:
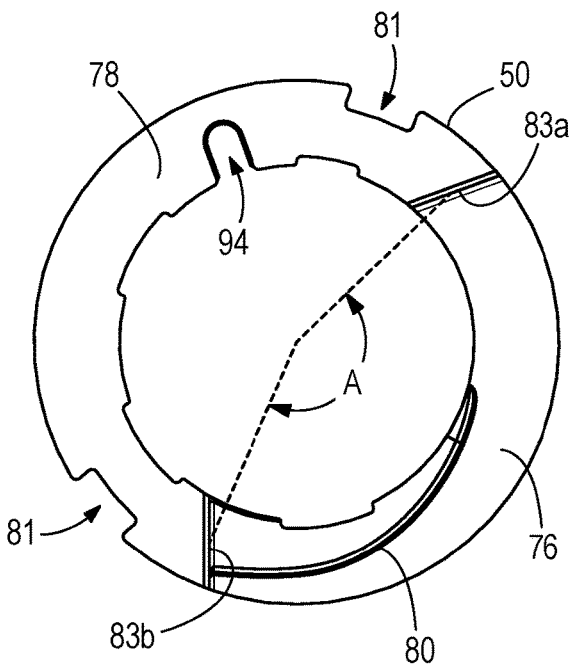
FIG. 8B is a front view of a rear cam member of the blade clamp mechanism of FIGS. 4A and 4B.

The rear cam member 50 is rotationally positioned over the sleeve 48. The flange 60 of the sleeve 48 limits axial movement of the rear cam member 50 in the rearward direction. Referring to FIGS. 6, 8A, and 8B, the rear cam member 50 includes a base portion 76, a raised portion 78, and a rear cam surface 80. The rear cam surface 80 is positioned to act as an inner cam surface when engaged with the shoulder 70 of the pin 42 to facilitate movement of the pin 42 radially outward, as described below in more detail. Slots 81 are formed on the outer diameter of the rear cam member 50. The rear cam member 50 also includes first and second stop surfaces 83a, 83b where the raised portion 78 transitions to the base portion 76. The stop surfaces 83a, 83b delimit a rotatable range of the rear and front cam members 50, 52 between engaged (FIG. 10A) and released (FIG. 10B) positions. The front and rear cam members 50, 52 delimit a rotatable range A of the rear and front cam members 50, 52. In the illustrated embodiment, the rotatable range A is less than 180 degrees.

Figure 7A:
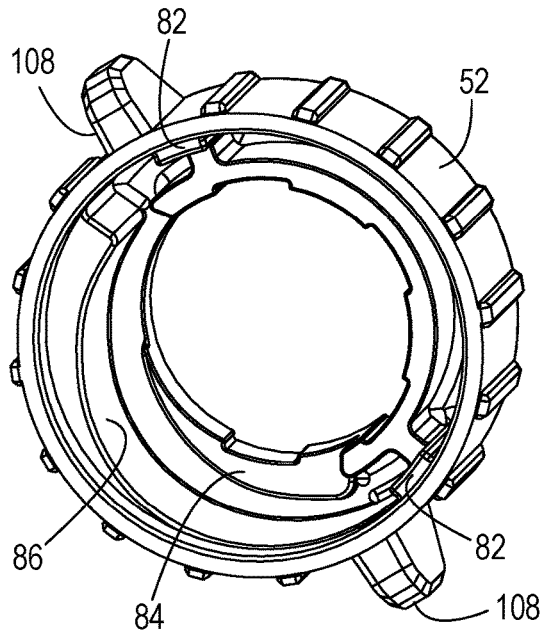
FIG. 7A is a perspective view of a front cam member of the blade clamp mechanism of FIGS. 4A and 4B.
Figure 7B:
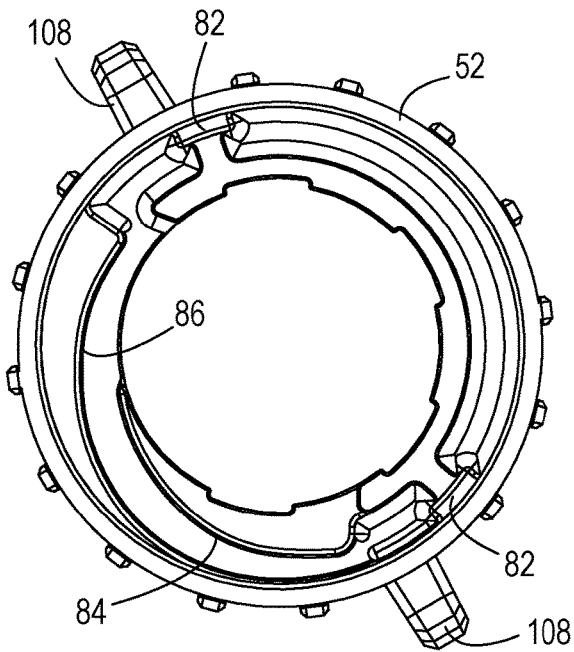
FIG. 7B is a rear view of a front cam member of the blade clamp mechanism of FIGS. 4A and 4B.

FIGS. 6, 7A, and 7B show that the front cam member 52 is rotatably positioned over the sleeve 48 and in engagement with the rear cam member 50. The raised portion 78 of the rear cam member 50 is positioned within the front cam member 52 such that the slots 81 engage splines 82 that are formed on the inner diameter of the front cam member 52. The front cam member 52 includes a front cam surface 84 in axially spaced, opposed relation to the rear cam surface 80. The front cam surface 84 is positioned to act as an inner cam surface when engaged with the shoulder 70 of the pin 42 to facilitate movement of the pin 42 radially outward. The front and rear cam surfaces 80, 84 provide balanced forces on the pin 42 (FIG. 9B).

The front cam member 52 further includes an outer cam surface 86 that is positioned radially outward from the pin 42 and that cooperates with the pin 42 to selectively move the pin 42 inward toward the slot 56 to engage the saw blade 40, as described below in more detail. The outer cam surface 86 radially cams the outer surface of the head portion 68 at the same rate as the cam surfaces 80, 84 to facilitate smooth movement of the pin 42.

With reference to FIGS. 6, 9A, and 9B, the front retainer clip 54 engages a groove 89 in the sleeve 48 and the rear retainer clip 55 engages a groove 91 in the spindle 32. Together, the retainer clips 54, 55 retain the entire assembled mechanism 38 mounted on the tip of the spindle tip 36.

The rear and front cam members 50, 52 are rotatable relative to the spindle 32 between an engaged position (FIGS. 9A and 10A) in which the pin 42 is forced toward the slot 56, and a disengaged position (FIGS. 9B and 10B) in which the pin 42 is forced away from the slot 56. In this way, the rear and front cam members 50, 52 function as an actuating member that is operatively associated with the pin 42, which functions as a locking member.

FIGS. 6, 9A, and 9B show that the spring 46 is positioned to the rear of the rear cam member 50. The spring 46 includes a rear leg 90 positioned within the slot 56, and a front leg 92 positioned within a groove 94 in the rear cam member 50. The spring 46 is interconnected with the rear cam member 50 for biasing the blade clamp mechanism 38. The spring 46 functions as a biasing member and is positioned to bias the actuating member (e.g., the rear and front cam members 50, 52) toward the engaged position. The spring cover 44 is rotatably positioned over the spindle tip 36 and encloses a substantial portion of the spring 46 to inhibit outside contaminants from affecting the action of the spring 46. The spring cover 44 includes a front lip 96 that fits within the inner edge of the front cam member 52.

Figure 5:
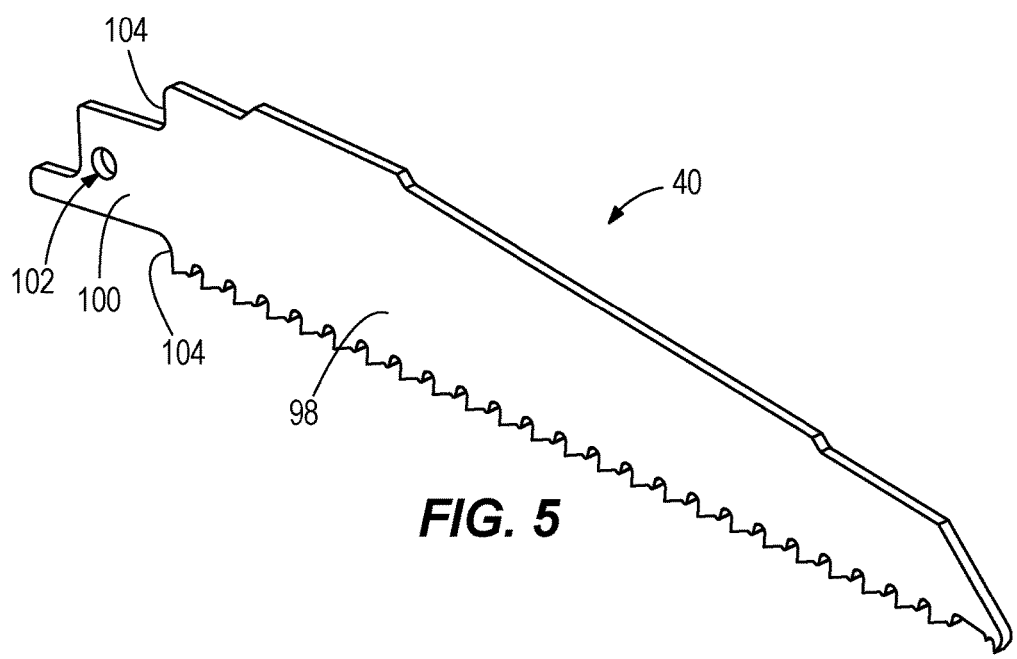
FIG. 5 is a perspective view of a saw blade for use with the reciprocating saw of FIG. 1.

With reference to FIG. 5, the saw blade 40 includes a main portion 98, a tang 100, a hole 102, and two shoulder portions 104. The pin 42 is inserted into or through the hole 104 when the blade 40 is inserted into the mechanism 38. The shoulder portions 104 form the transition from the tang 100 to the main portion 98. When the blade 40 is inserted into the slot 56, the shoulder portions 104 engage the sleeve 48 at two locations.

Figure 12:
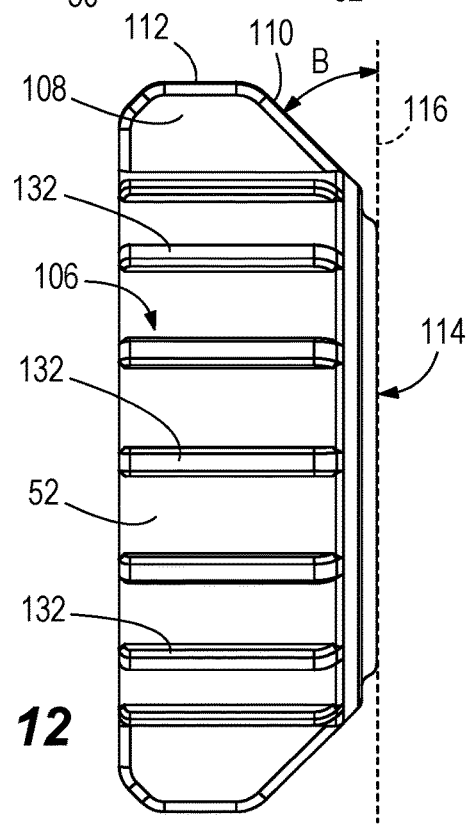
FIG. 12 is a side view of the front cam member of FIGS. 7A and 7B.

With reference to FIGS. 7A, 7B, the front cam member 52 has an outer gripping surface 106 (e.g., cylindrical) with tabs 108 that protrude radially outward from the gripping surface 106. In the illustrated embodiment, the front cam member 52 includes two tabs 108 located opposite each other (e.g., diametrically opposite). With reference to FIG. 12, each tab 108 includes a chamfered forward edge 110 and a flat top edge 112 that is connected to the forward edge 110. a front face 114 of the front cam member 52 defines a front plane 116, and the chamfered forward edge 110 defines a chamfer angle B with respect to the front plane 116. The chamfer angle B is approximately 45 degrees in the illustrated embodiment. In other embodiments, the chamfer angle can be, for example, between 30 degrees and 60 degrees.

Figure 13:
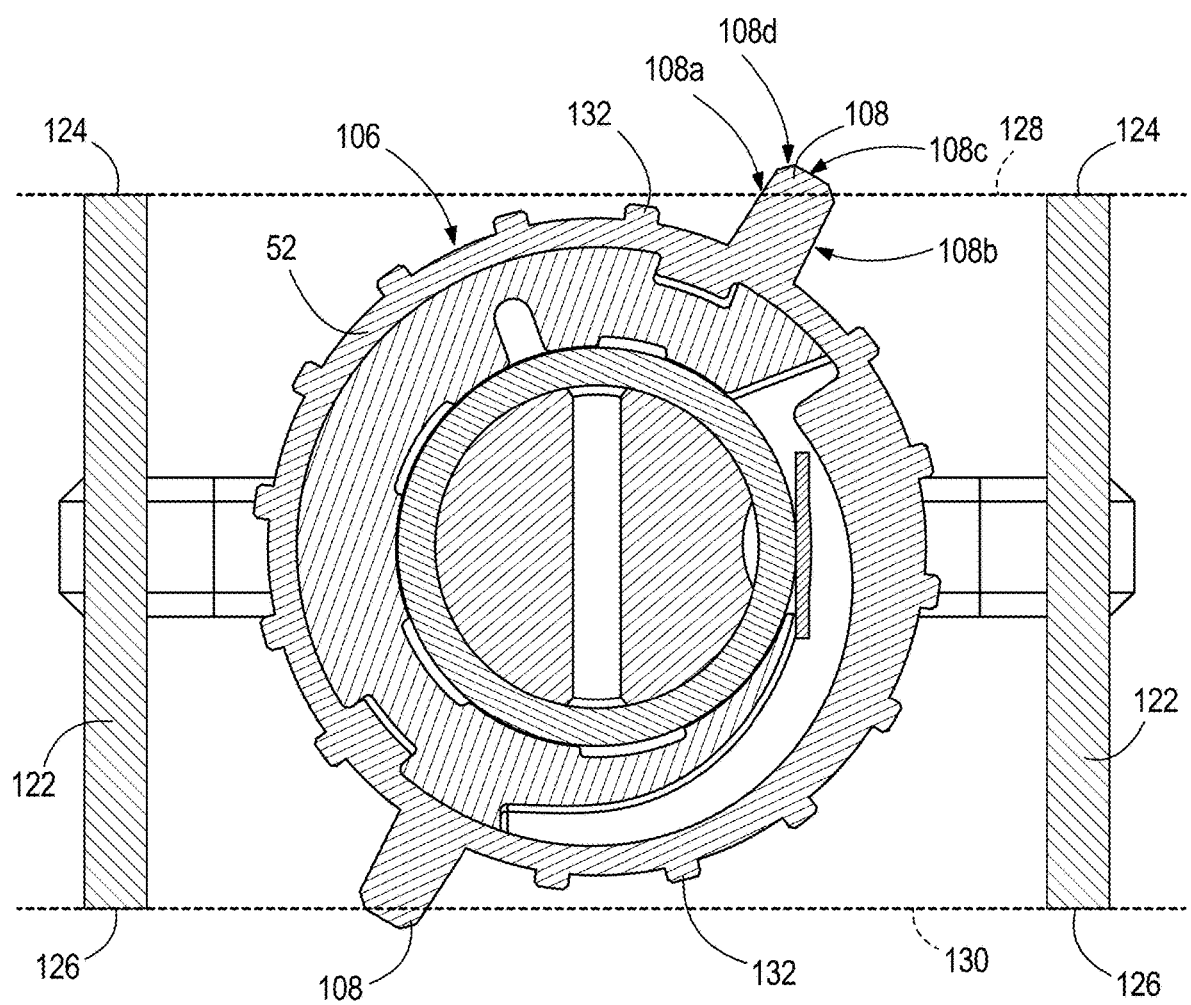
FIG. 13 is a section view taken along line 13-13 in FIG. 1 illustrating the blade clamp mechanism.

With reference to FIGS. 1 and 13, the shoe 24 is supported by a bracket assembly 120 that includes two forwardly extending bars 122 positioned on lateral sides of the blade clamp mechanism 38. The bars 122 are shown in cross-section in FIG. 13. Each bar 122 includes a flat upper edge 124 and a flat lower edge 126. The flat upper edges 124 of the bars 122 define an upper shoe plane 128 and the flat lower edges of the bars 122 define a lower shoe plane 130. With the front cam member 52 in the engaged position as shown in FIG. 13 (i.e. with the blade clamp mechanism 38 in an engaged condition), one of the tabs 108 protrudes beyond the upper shoe plane 128 and the other of the tabs 108 protrudes beyond the lower shoe plane 130. The tabs 108 each include a first planar lateral surface 108a and a second planar lateral surface 108b located opposite the first planar lateral surface 108a (e.g., in the circumferential direction). The tabs 108 each further include a tip end surface 108c spaced from the gripping surface 106. The tip end surface 108c extends between the first planar lateral surface 108a and the second planar lateral surface 108b. As shown in FIG. 13, with the front cam member 52 in the engaged position, the upper shoe plane 128 intersects both the first planar lateral surface 108a and the tip end surface 106 and the upper shoe plane 128 does not intersect the second planar lateral surface 108b. As a result, in the engaged position, a portion 108d of the tab 108 adjacent the tip end surface 108c protrudes beyond the upper shoe plane 128. This allows a user to more easily grasp the tabs 108 because they are not fully obstructed by the bars 122. When the front cam member 52 is rotated to the released position (e.g., FIG. 10B), the tabs 108 are positioned between the upper and lower shoe planes 128, 130, respectively, with both the upper tab 108 and lower tab 108 as viewed in FIG. 10B positioned below the upper shoe plane 128 and above the lower shoe plane 130.

With reference to FIG. 12, the front cam member 52 further includes a plurality of ridges 132 protruding radially from the gripping surface 106 and extending axially along the gripping surface 106. As shown, the ridges 132 and a second set of ridges 132 are disposed on the gripping surface 106 between the tabs 108. The ridges 132 protrude radially to a height that is shorter than the height of the tabs 108 and assist a user with gripping the front cam member 52.

In operation, before a saw blade is inserted, the rear and front cam members 50, 52 are normally in the engaged position due to the biasing action of the spring 46. To insert a saw blade 40, cam member 50, 52 is engaged by the user and rotated to the released position (FIG. 10B), which engages the rear and front cam surfaces 80, 84 with the shoulder 70 of the pin 42 and forces the pin 42 to move out of the slot 56. The tang 100 of the saw blade 40 is then inserted into the slot 56 until the shoulder portions 104 of the saw blade 40 contact the sleeve 48. The rear and front cam members 50, 52 are then allowed to rotate back to the engaged position (FIG. 10A) due to the biasing force of the spring 46. When moving from the released position to the engaged position, the outer cam surface 86 of the front cam member 52 forces the pin 42 to move into the hole 104 in the saw blade 40, which clamps the saw blade 40 in the mechanism 38. The saw blade 40 is released by rotating the rear and front cam members 50, 52 against the biasing force of the spring 46. This forces the pin 42 to move out of the slot 56, allowing the saw blade 40 to be pulled from the slot 56.

Various features of the disclosure are set forth in the following claims.

The invention claimed is:

1. A reciprocating tool comprising:
   a housing;
   a spindle mounted for reciprocating movement within the housing and having an end configured to receive a saw blade;
   a blade clamp mechanism supported on the spindle and configured to attach the saw blade to the spindle, the blade clamp mechanism including
      a lock movable relative to the spindle between a locked position that locks the saw blade to the spindle and an unlocked position that releases the saw blade; and
      an actuator supported adjacent the end of the spindle and rotatable relative to the spindle between an engaged position corresponding to the locked position of the lock, and a released position corresponding to the unlocked position of the lock, the actuator defining an outer gripping surface with ridges and including a first tab and a second tab, each of the first tab and the second tab protruding radially from the outer gripping surface; and
   a shoe assembly coupled to the housing and including a first bar and a second bar, each of the first bar and the second bar having a flat upper surface cooperatively defining an upper shoe plane and a flat lower surface cooperatively defining a lower shoe plane;
   wherein the first tab includes a first planar lateral surface, a second planar lateral surface located opposite the first planar lateral surface, and a tip end surface spaced from the gripping surface, the tip end surface extending an entire distance between the first planar lateral surface and the second planar lateral surface;
   wherein when the actuator is in the engaged position,
      the upper shoe plane intersects the first planar lateral surface and the tip end surface of the first tab but does not intersect the second planar lateral surface of the first tab,
      at least a portion of the first tab protrudes beyond the upper shoe plane, and
      at least a portion of the second tab protrudes beyond the lower shoe plane; and
   wherein when the actuator is in the released position,
      the first tab is positioned between the upper shoe plane and the lower shoe plane, and
      the second tab is positioned between the upper shoe plane and the lower shoe plane.

2. The reciprocating tool of claim 1, wherein the actuator includes a rear end facing the housing and a front end opposite the rear end, and wherein the first tab includes a chamfered forward edge located proximate the front end and a flat top edge that extends from the chamfered forward edge toward the rear end.

3. The reciprocating tool of claim 2, wherein the front end includes a front face that defines a front plane, and wherein the forward edge defines a chamfer angle with respect to the front plane, wherein the chamfer angle is between 30 degrees and 60 degrees.

4. The reciprocating tool of claim 2, wherein the first planar lateral surface extends between the outer gripping surface and the flat top edge.

5. The reciprocating tool of claim 1, wherein the actuator includes a rear end facing the housing and a front end opposite the rear end, and wherein each of the ridges extends axially along an entire length of the outer gripping surface between the front end and the rear end.

6. The reciprocating tool of claim 1, wherein when the actuator is in the engaged position, the upper shoe plane further intersects a chamfered forward edge of the first tab and the lower shoe plane further intersects a chamfered forward edge of the second tab.

7. A reciprocating tool comprising:
a housing;
a spindle mounted for reciprocating movement within the housing and having an end configured to receive a saw blade;
a blade clamp mechanism supported on the spindle and configured to attach the saw blade to the spindle, the blade clamp mechanism including
a lock movable relative to the spindle between a locked position that locks the saw blade to the spindle and an unlocked position that releases the saw blade; and
an actuator supported on the end of the spindle and rotatable relative to the spindle between an engaged position corresponding to the locked position of the lock, and a released position corresponding to the unlocked position of the lock, the actuator defining an outer gripping surface and including a tab that protrudes radially from the outer gripping surface, the tab including
a first planar lateral surface extending transverse to the outer gripping surface, and
a second planar lateral surface extending transverse to the outer gripping surface and opposite the first planar lateral surface, and
a tip end surface spaced from the gripping surface and extending an entire distance between the first planar lateral surface and the second planar lateral surface; and
a shoe assembly coupled to the housing, the shoe assembly including a first bar and a second bar, each bar having a flat upper surface and a flat lower surface, the flat upper surfaces cooperatively defining an upper shoe plane, and the flat lower surfaces cooperatively defining a lower shoe plane,
wherein when the actuator is in the engaged position, the upper shoe plane intersects the first planar lateral surface and the tip end surface, and the upper shoe plane does not intersect the second planar lateral surface, and
wherein when the actuator is in the released position, the tip end surface is positioned between the upper shoe plane and the lower shoe plane.

8. The reciprocating tool of claim 7, wherein the actuator includes a rear end facing the housing and a front end opposite the rear end, and wherein the tab includes a chamfered forward edge located proximate the front end and a flat top edge that extends from the chamfered forward edge toward the rear end.

9. The reciprocating tool of claim 8, wherein the front end includes a front face that defines a front plane, and wherein the forward edge defines a chamfer angle with respect to the front plane, the chamfer angle being between 30 degrees and 60 degrees.

10. The reciprocating tool of claim 8, wherein the first planar lateral surface extends between the outer gripping surface and the flat top edge.

11. The reciprocating tool of claim 7, wherein the tab comprises a first tab and the actuator further includes a second tab that protrudes radially from the outer gripping surface, and wherein the first tab is located opposite the second tab.

12. The reciprocating tool of claim 11, wherein when the actuator is in the engaged position, at least a portion of the second tab protrudes beyond the lower shoe plane.

13. The reciprocating tool of claim 12, wherein when the actuator is in the released position, the at least a portion of the second tab is positioned above the lower shoe plane.

14. The reciprocating tool of claim 7, wherein the actuator rotates less than 180 degrees between the engaged position and the released position.

\* \* \* \* \*